United States Patent [19]

Carlsson et al.

[11] Patent Number: 4,718,843

[45] Date of Patent: Jan. 12, 1988

[54] HOT PRESS FOR TREATING A WEB OF MATERIAL

[75] Inventors: Bengt J. Carlsson, Enebyberg; Rolf T. Larsson, Kil, both of Sweden

[73] Assignee: Sunds Defibrator AB, Sundsvall, Sweden

[21] Appl. No.: 934,447

[22] PCT Filed: Mar. 7, 1986

[86] PCT No.: PCT/SE86/00096

§ 371 Date: Nov. 12, 1986

§ 102(e) Date: Nov. 12, 1986

[87] PCT Pub. No.: W086/05441

PCT Pub. Date: Sep. 25, 1986

[30] Foreign Application Priority Data

Mar. 13, 1985 [SE] Sweden ............................ 8501238

[51] Int. Cl.⁴ ........................................ B29C 43/42

[52] U.S. Cl. ........................ 425/371; 100/93 RP; 100/118; 100/153; 100/154; 156/583.5

[58] Field of Search ................. 425/335, 371, 364 R; 100/93 RP, 118, 153, 154; 156/583.5

[56] References Cited

U.S. PATENT DOCUMENTS

| | | | |
|---|---|---|---|
| 1,185,399 | 5/1916 | Hayes | 425/371 |
| 1,814,172 | 7/1931 | Martinet | 425/364 |
| 3,272,115 | 9/1966 | Hurlbijt | 425/371 |
| 3,945,789 | 3/1976 | Boman | 425/371 |
| 4,002,114 | 1/1977 | Guttinger | 100/118 |
| 4,230,649 | 10/1980 | Bohm et al. | 425/371 |
| 4,334,468 | 6/1982 | Guttinger et al. | 425/371 |
| 4,480,978 | 11/1984 | Gerhardt | 425/371 |
| 4,642,153 | 2/1987 | Lohr | 425/371 |

FOREIGN PATENT DOCUMENTS

| | | | |
|---|---|---|---|
| 3119529 | 2/1982 | Fed. Rep. of Germany . | |
| 422907 | 8/1980 | Sweden . | |
| 1320283 | 6/1973 | United Kingdom | 425/371 |

*Primary Examiner*—Willard E. Hoag

*Attorney, Agent, or Firm*—Bell, Seltzer, Park & Gibson

[57] ABSTRACT

A press with cooperating endless belt, fixed platens and having movable rolls fed between the platens and belts. Plural aligned wheel means are provided for feeding and spacing the rolls as they enter the pressing zone between the platens and belts.

11 Claims, 9 Drawing Figures

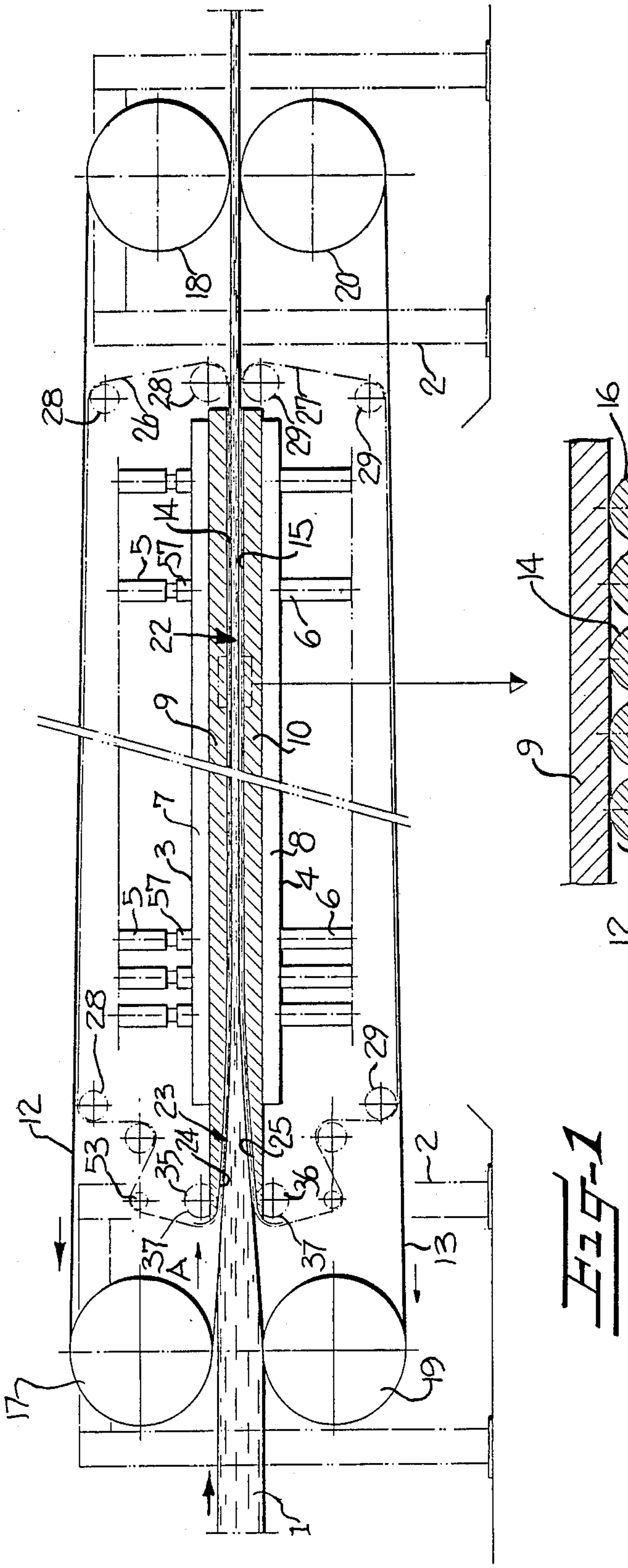
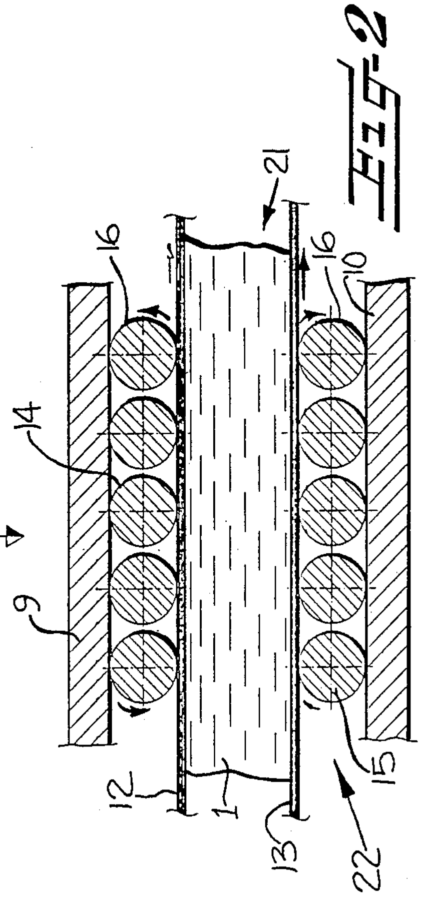

HOT PRESS FOR TREATING A WEB OF MATERIAL

The present invention relates to a hot press for continuous treating a continuous web of material which is rolled into rolls or cut into boards, said hot press comprising an upper and a lower press platen, both of which are horizontal, an upper press belt running between the press platens in an upper loop over guide rolls and a corresponding lower press belt running between the press platens in a lower loop over guide rolls, and an upper movable bed of rolling bodies arranged between the upper press platen and the upper press belt, and a lower movable bed of rolling bodies arranged between the lower press platen and the lower press belt, said rolling bodies consisting of solid, elongate cylindrical rods arranged to be conveyed in a course of circuit through the hot press, said press belts defining between them within the region of the press platens a pressing zone having an entry section converging in the direction of movement of the web, for introducing said web.

Due, inter alia, to errors in the shape of said rolling bodies, a corresponding deviation occurs from the precise rolling pattern, causing the relative distance between the rolling bodies to gradually alter during their passage through the pressing zone. Entirely cylindrical rods having different diameters move at half the belt speed without any alteration in the relative distance, but the rods having the smaller diameters roll with higher angular speed. A non-cylindrical rod, e.g. frustum of a cone, will also start to roll at this speed but will gradually be turned until the internal turning torques can no longer balance the frictional forces at the rolling generatrices. The rolling is then combined with a certain sliding or racing which is positive in certain sections of the length of the rod and negative in other sections. The magnitude of the error in shape, friction coefficient and rod diameter determine the effect on the speed of movement. With the rod dimensions generally used, i.e. rods having a diameter of 10–20 mm, the error of shape for a single rod can be kept within a value of well under 0.005 mm at a reasonable cost. For a hot press with a length of up to 25 m, the initial clearance between the rods could then be limited to 1–2 mm.

It has previously been suggested to use rolling bodies which are short in relation to the width of the press and joined together by means of links or the like to a plurality of chains arranged side by side. This prevents the rolling bodies from coming into contact with each other during their passage through the pressing zone. However, a rolling bed constructed in this manner is expensive as well as there being both sliding and roll friction between the rolling bodies and the linearly movable link elements. According to another, more favourable embodiment, the rolling bed comprises rolling bodies in the form of long rods extending across the entire width of the press and connected at the ends to endless conveyor chains which move the rods in a course of circuit through upper and lower loops. The distance or clearance between the rods when introduced into the pressing zone must then be adjusted depending on the length of the press, i.e. the rolling distance, so that a rod cannot roll to catch up the next one in front. The rods must be fed into the pressing zone with an accuracy in the order of 0.5 mm with respect to straightness and positioning. Since the rods are generally 2–3 m in length, and relatively slim, they must be guided at several points along their length when being fed in.

German published specification No. 2.215.618 describes a device in a board press which discontinuously ejects and aligns the rods at right angle to the movement of the steel belts. At the not abnormal speed of 20 m/min for the steel belts, i.e. 10 m/min for the beds of rods, and with a rod pitch of 17 mm, 10 rods per second must be ejected into the board press. This task has proved impossible to carry out in practice. German published specification No. 3.119.529 describes a continuously operating hot press comprising two steel belts and rod feeding devices having a plurality of complicated chains distributed across the width of the steel belts, each of which runs over two wheels. The chains, moving synchronously at half the speed of the belts, carry rollers with a roller pitch corresponding to that desired for the rods. The rollers of the chains are pressed against the rods which in turn are pressed against the steel belts with the intermediate web of material as support. However, due to wear the roller pitch cannot be kept constant, whereby certain chains become overloaded if the pitch changes at different rates for the various chains. The large number of rollers, links and bolts in the chains entails greater risk for some of the connecting elements breaking. If a roller in one of the chains would crack it is practically unavoidable that the pieces of the roller continue into the pressing zone, thus seriously damaging the steel belts, rods and support surfaces for the rods. Another drawback of this hot press is that the course of the rods is uncertain when they leaving the outer guide plates, before reaching the steel belt and the rollers of the chain. Furthermore, due to reverse rotation at the guide plates, the rods must be accelerated in about a tenth of a second at this transition to the same speed of rotation in the opposite direction. A substantially similar hot press is described in German published specification No. 3.312.856.

U.S. Pat. No. 4,417,866 (substantially corresponding to Swedish patent specification No. 8202796-2) proposes arranging the rods in a hot press between press platens and press belts free from holders and chains upon passage through the hot press. Even if this eliminates the problems of chain engagements, other problems arise because the feeding of the rods into the pressing zone has not been solved in an efficient manner. The known hot press is provided with two toothed wheels, the rods being ejected from the spaces between the teeth by radially journalled arms having followers cooperating with a cam. The arrangement does not permit any satisfactory alignment of the rods before they reach the pressing zone, nor any uniform delivery to the pressing zone to achieve constant distance between the rods. The specification does not show or describe how such a feeding device is designed for the upper rolling bed where the force of gravity must also be taken into consideration.

The object of the present invention is to provide a hot press having special means for aligning and feeding the rods to respective rolling beds, said means ensuring both accurate alignment of the rods before they are fed into the pressing zone so that they are positioned perpendicular to the direction of movement of a press belt, accurate straightness so that an optimal rolling pattern is obtained in the rolling bed, and an accurate feeding of the rods to the rolling bed so that a predetermined pitch between the rods is obtained.

According to the invention the above object is obtained substantially in that an aligning and feeding means is arranged for each bed of rods in connection to said entry section of the pressing zone, and comprises a rotatable wheel unit arranged within the entry section of the pressing zone and comprising a horizontal, rotatable shaft journalled perpendicularly to the direction of movement of the press belt, and a plurality of wheels secured to said shaft, each of said wheels peripherally supporting a plurality of relatively short cylindrical rollers which are rotatably journalled with their central axes parallel to the shaft of the wheel unit, said rollers of one wheel being aligned with the rollers of the other wheels to form rows of rollers located transverse to the direction of movement of the press belt and having coinciding central axes, and that the rows of rollers in the rotatable wheel unit are arranged to be brought into contact with the rods recirculated to the entry section in such a manner that, upon contact with one rod, one row of rollers retards the movement of said one rod in relation to the press platen, thus packing the other rods located next upstream closely together, and then delivers said one rod to the pressing zone for free rolling with a predetermined pitch between the rods.

A certain discrepancy can be predicted from rod to rod due to the bendings of the slim rods caused by natural weight, possible permanent deformation after a certain time in operation, thermal deformation, etc., even if the rods have limited freedom of movement at their ends. The invention provides a controlled manner of packing the rods together when they are inserted into the entry section so that the rods thus are aligned and achieve a straightened condition along their entire length. This is a basic condition if the continued handling of the rods is to give the result intended. After the straight alignment, the rods can be accurately positioned with a predetermined pitch. The alignment and feeding means according to the invention thus enables the accuracy of about 0.5 mm to be achieved, which is considered essential.

The invention will be described further in the following with reference to the accompanying drawings.

FIG. 1 is a side-elevational view schematically illustrating a hot press provided with aligning and feeding means in accordance with the present invention.

FIG. 2 is an enlargement of a part within the pressing zone of the hot press according to FIG. 1 as indicated.

Figure 3:
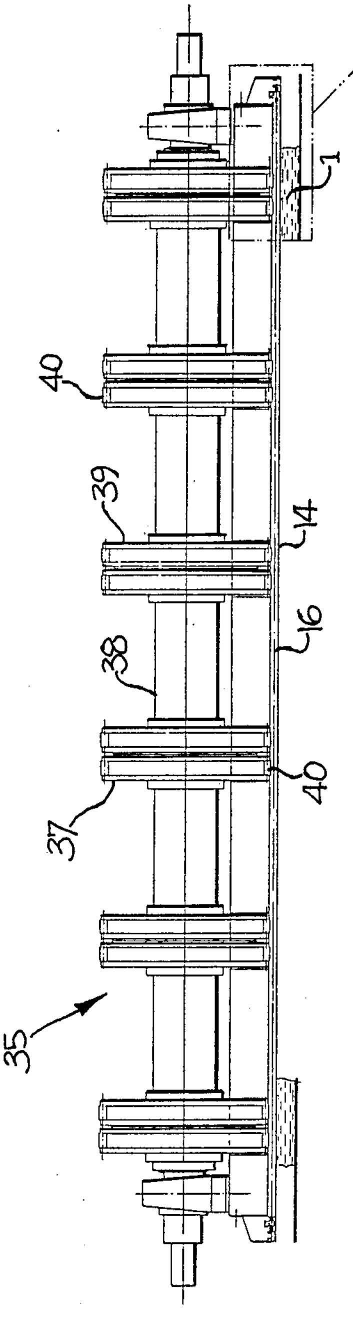
FIG. 3 shows the upper aligning and feeding means in the hot press according to FIG. 1, seen in the direction of the arrow A.

With reference to FIG. 1 it is schematically shown therein a hot press for continuous pressure and heat treatment of a continuous web of material 1, which is then rolled into rolls or cut into boards, e.g. particle boards, fibreboards and mineral wool boards. The hot press comprises a stand 2, an upper, horizontal press platen 3 and a lower horizontal press platen 4. The press platens are supported by transverse, force-absorbing beams 5, 6 secured at their ends to vertical supports (not shown) of the stand. The upper press platen is also provided with a plurality of hydraulic cylinders 57 mounted between the press platen and the beams 5 to permit adjustment of the upper press platen 3 in relation to the lower press platen 4. Each press platen comprises an external support plate 7, 8 and an internal press plate 9, 10 provided with suitable heating means (not shown).

The hot press also includes an upper endless press belt 12, a lower endless press belt 13, an upper movable bed 14 and a lower movable bed 15. The movable beds 14 and 15 are formed of rolling bodies in the form of solid, elongate, cylindrical rods 16 (FIG. 2), usually consisting of a steel material. There is such a bed of rods between each press belt 12, 13 and press plate 9, 10 in order to roll in uninterrupted surface contact with the press belt and press plate.

Said upper press belt 12 runs in an upper loop around guide rolls 17, 18 and said lower press belt 13 runs in a lower loop around guide rolls 19, 20. The press belts thus pass between the press platens separated from each other in order to define a space 21 (FIG. 2) between them for the receipt of the web 1 which is fed into the hot press in the direction indicated by an arrow (FIG. 1) for compression between the press belts while applying a predetermined pressure and heat from the press platens 3, 4 via the beds 14, 15 of rods 16 and press belts 12, 13. The press platens thus form a pressing zone 22 for the web 1, said pressing zone 22 comprising an entry section 23 converging in the direction of movement of the web and defined by curved surface portions 24, 25 of the opposing press plates 9, 10. In the embodiment shown the distance between the press belts 12, 13 in the remaining section of the pressing zone 22 is constant. Said distance is adjustable by corresponding movement of the upper press platen 3 by means of the hydraulic cylinders 6 in order to adjust the distance to prevailing operating conditions. According to an alternative embodiment the distance between the belts is not constant but decreases in the direction from the entry section along the greater part of the pressing zone.

The press belts 12 and 13 are driven at the same speed in the directions indicated by arrows, by drive means (not shown) which are connected to the guide rolls. The guide rolls 17, 18, 19 and 20 are also in a known manner responsible for the stretching of the press belts and their guiding laterally.

Figure 9:
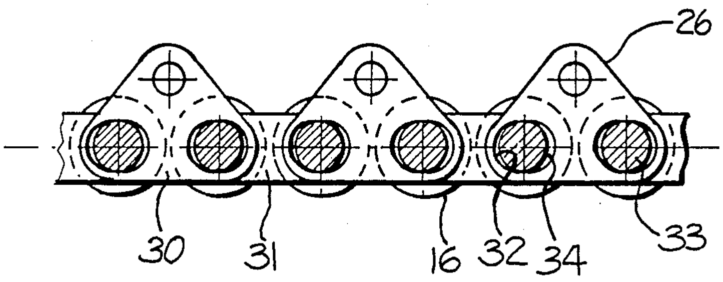
FIG. 9 shows links in a chain for recirculating the rods.

The rods 16 forming the beds 14, 15 are arranged to move in a course of circuit through the pressing zone 22 and back to the entry section 23 of the pressing zone. The return of the rods is effected by suitable transport means. In the embodiment shown the transport means comprises specially designed links running over a plurality of wheels 28, 29 and, together with the rods 16, forms an upper and lower chain 26, 27. The connection of the rods to the links may be made resilient or with clearance or in some other way similarly permitting the relative distance between the rods to be varied and adjusted as desired depending on the location of a rod in its course of circuit. It must be possible for this distance to vary between 0 and a suitable upper value, e.g. 4 mm. In the embodiment shown in more detail in FIG. 9 the chains comprise links 30, 31 provided with oval or eliptical apertures 32 for receiving the end pin 33 of the rods. The apertures are so dimensioned in horizontal direction as to form a considerable and sufficient play or clearance 34 for the end pins 33 permitting the distance between the rods to be varied as stated above. The driving of the chains 26, 27 is adjusted in relation to the driving of the press belts 12, 13.

Figure 4:
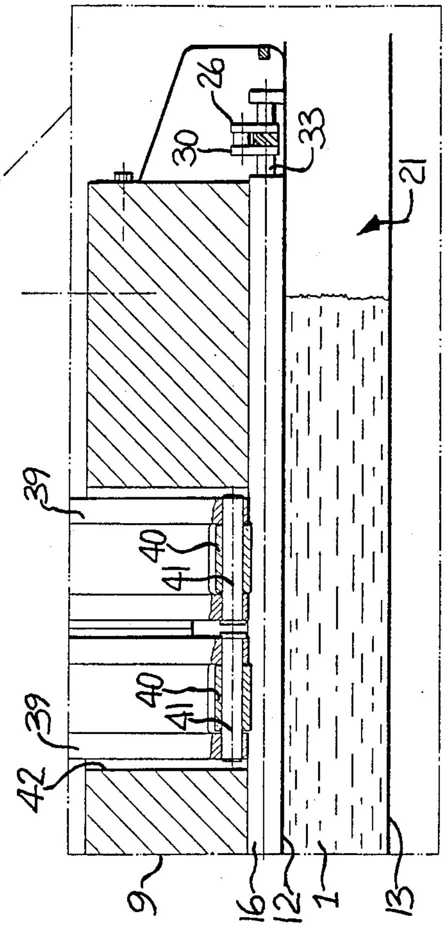
FIG. 4 is an enlargement of a part of the entry section of the hot press and aligning and feeding means according to FIG. 3.
Figure 5:
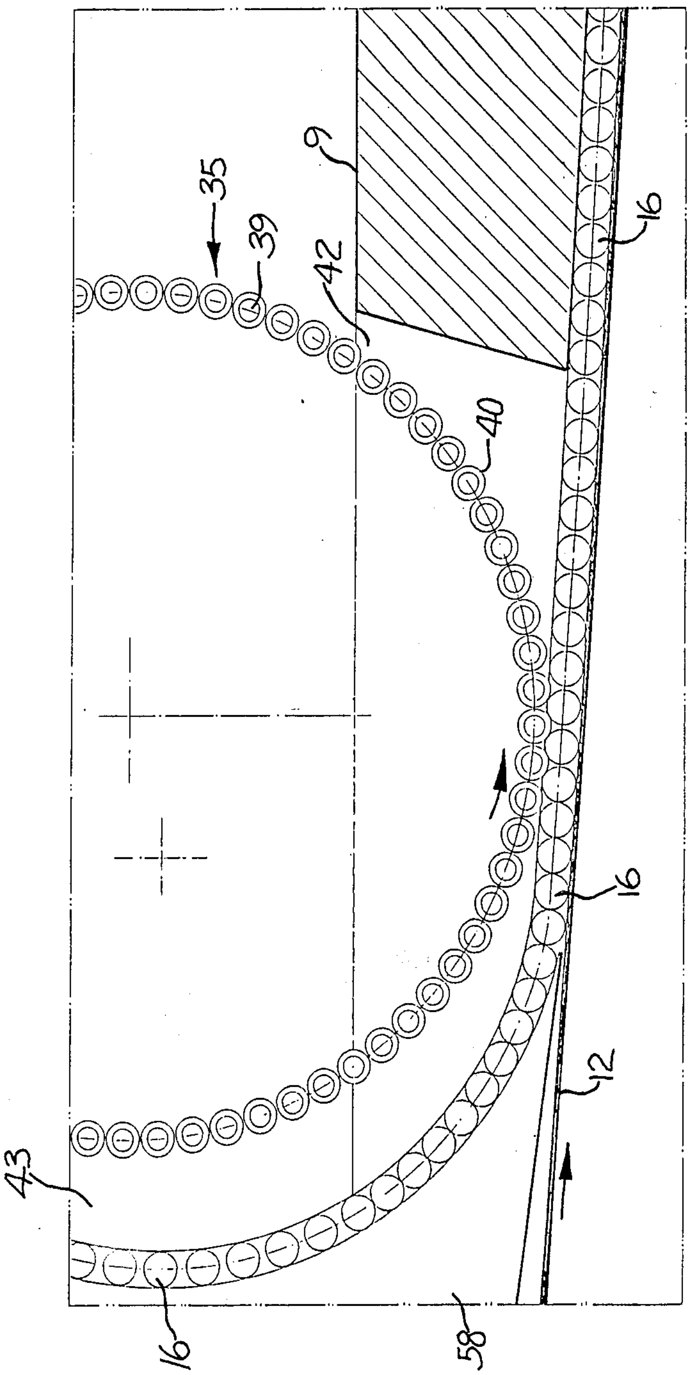
FIGS. 5 and 6 are different cross sections of parts of the hot press at the aligning and feeding means according to FIG. 3.

According to the present invention the hot press also includes special means 35, 36 for aligning and feeding the rods 16 into the pressing zone 22 in an accurately controlled manner, whereby one such means is provided for each bed 14, 15 in connection to the entry section 23 of the pressing zone. Each aligning and feeding means 35, 36 includes a wheel unit 37 located within the entry section 23 of the pressing zone 22 and consisting of a horizontal, rotating shaft 38 and a plurality of wheels 39 secured thereto and distributed along the shaft. The wheels 39 are preferably identical and distributed uniformly along the shaft 38. The shaft 38 is journalled at right angles to the longitudinal centre line of the hot press, coinciding with the direction of movement of the press belts 12, 13 and the web 1. Each wheel 39 supports along its periphery a predetermined number of identical, relatively short, cylindrical, rollers 40 which are rotatably journalled with their central axes 41 parallel to the shaft 38. Each wheel unit 37 rotates in a direction in which its rollers 40 pass the entry section 23 in the same direction as the rods 16 and press belts 12, 13. The rollers 40 of a wheel 39 are accurately aligned with opposing rollers 40 of the other wheels so that the central axes 41 of all rollers 40 located in a row running transverse to the web 1 and press belts 12, 13 are coinciding. As will be seen from FIGS. 3 and 5, each shaft 38 is journalled at a predetermined distance from the beds 14, 15 of rods 16, so that each roller 40 when being nearest to the beds 14, 15 of rods 16, is brought into contact first with a rod located upstream and then also with the rod located next downstream. The press plates 9, 10 of the press platens, which are extended rearwardly and provided with inner curved surface portions 24, 25, are provided with vertical recesses 42 (FIG. 4) through which the wheels 39, rotating as a unit, are passing. The rods 16 will thus be accessible to the rollers 40 through these recesses. The advantage of making the rollers 40 rotatable is that they start rotating together with the rod 16 upon contact therewith, thus avoiding any damaging sliding friction between the contact surfaces. The curved surface portions 24, 25 give the press belts 12, 13 a corresponding bending so that the stretch force necessary to drive them presses the rods 16 against these surface portions 24, 25 of the press plates 9, 10. A plurality of curved guide plates 43, 58 are mounted immediately before the entry section 23 to guide the rods 16 before they reach the press belts 12, 13.

Figure 7:
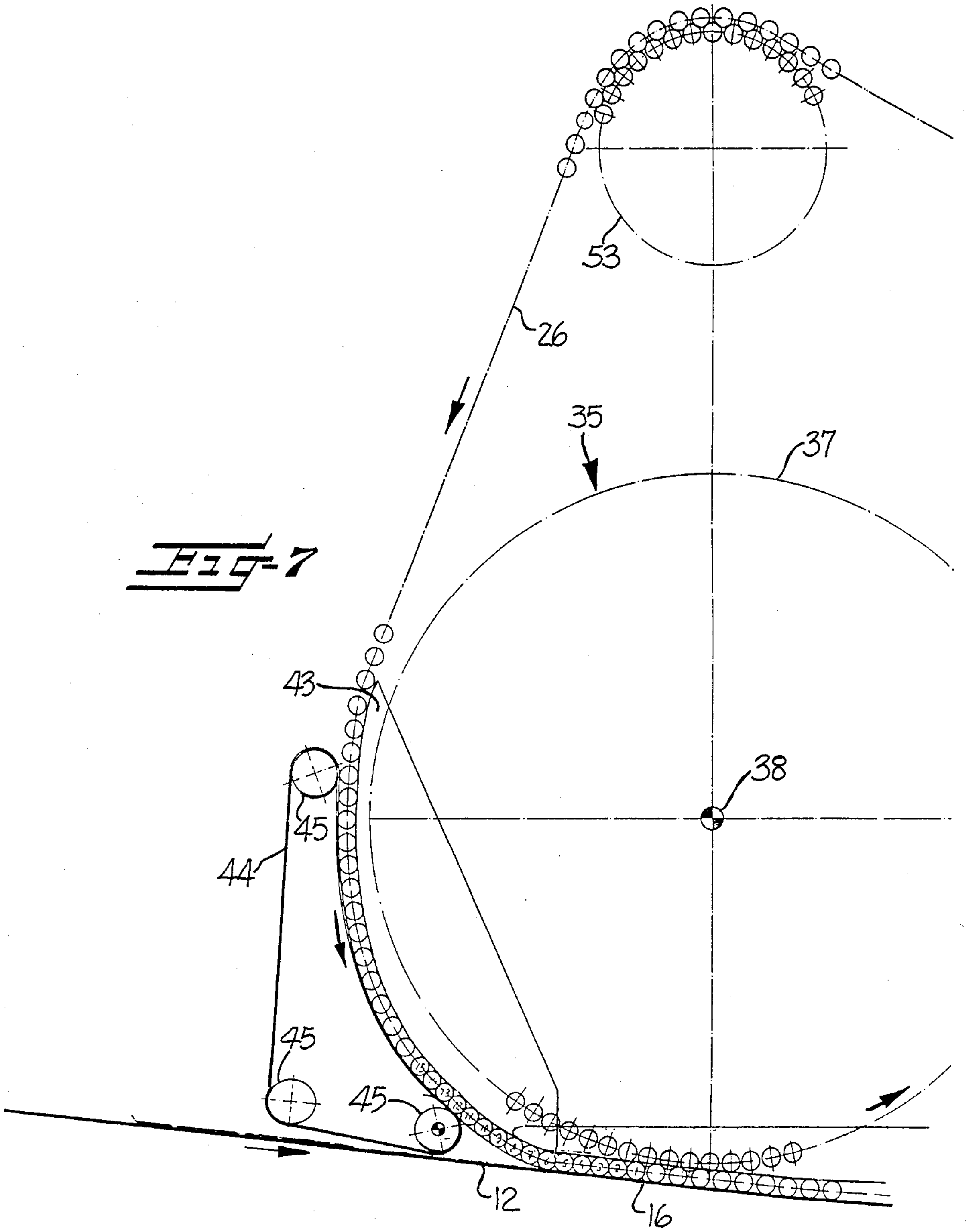
FIG. 7 shows a supplementary device in the upper aligning and feeding means of the hot press according to FIG. 1.
Figure 8:
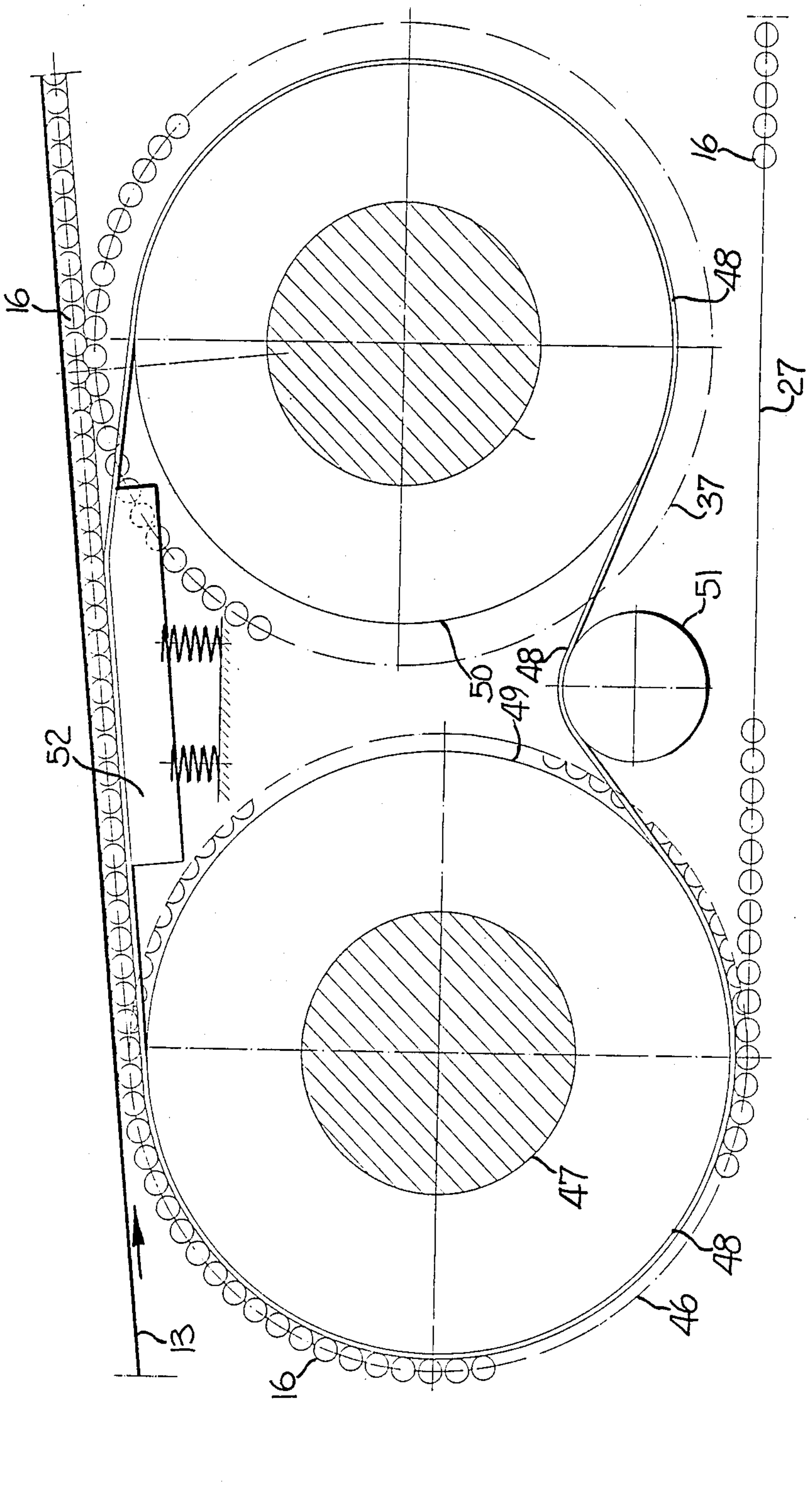
FIG. 8 shows another embodiment of a supplementary device in a lower aligning and feeding means according to the invention.

The aligning and feeding means according to the invention suitably also includes a supplementary device to assist in feeding the rods forward to a closely packed storage position in the immediate vicinity of respective rotating wheel units. Such a supplementary device, however, is not only responsible for feeding the rods forward. It also helps to align the rods so that they will be straight and also are positioned perpendicular to the direction of movement of the press belts. One embodiment of such a supplementary device is shown in more detail in FIG. 7 for cooperation with the upper chain conveyor. The device comprises at least two rotating strips, belts 44 or the like, each running over three pulleys 45 and in contact with the rods 16 to feed the rods forward and straighten them close together in the manner described. The belts 44 are driven at the same speed as the press belts 12, 13 or at a slightly higher speed. A similar device (not shown) is provided for the lower aligning and feeding means 36. FIG. 8 shows another embodiment of such a supplementary device for the lower aligning and feeding means 36. The device has two toothed wheels 46 on a common shaft 47 driven in predetermined relation to the adjacent wheel unit 37 by means of a coupling arrangement (not shown). Belts 48 are stretched over pulleys 49, 50 rotatably journalled on the shafts of the toothed wheel 46 and wheel unit 37, and driven by a pulley 51 at a slower speed than that of the press belt 13 and in the same direction as this. The belts 48 are pressed against the rods 16 by resilient guide strips 52 so that the rods will come into contact with the lower press belt 13 and are rolled by this onto the belts and are given a translation speed somewhat greater than half the speed of the press belt.

Figure 6:
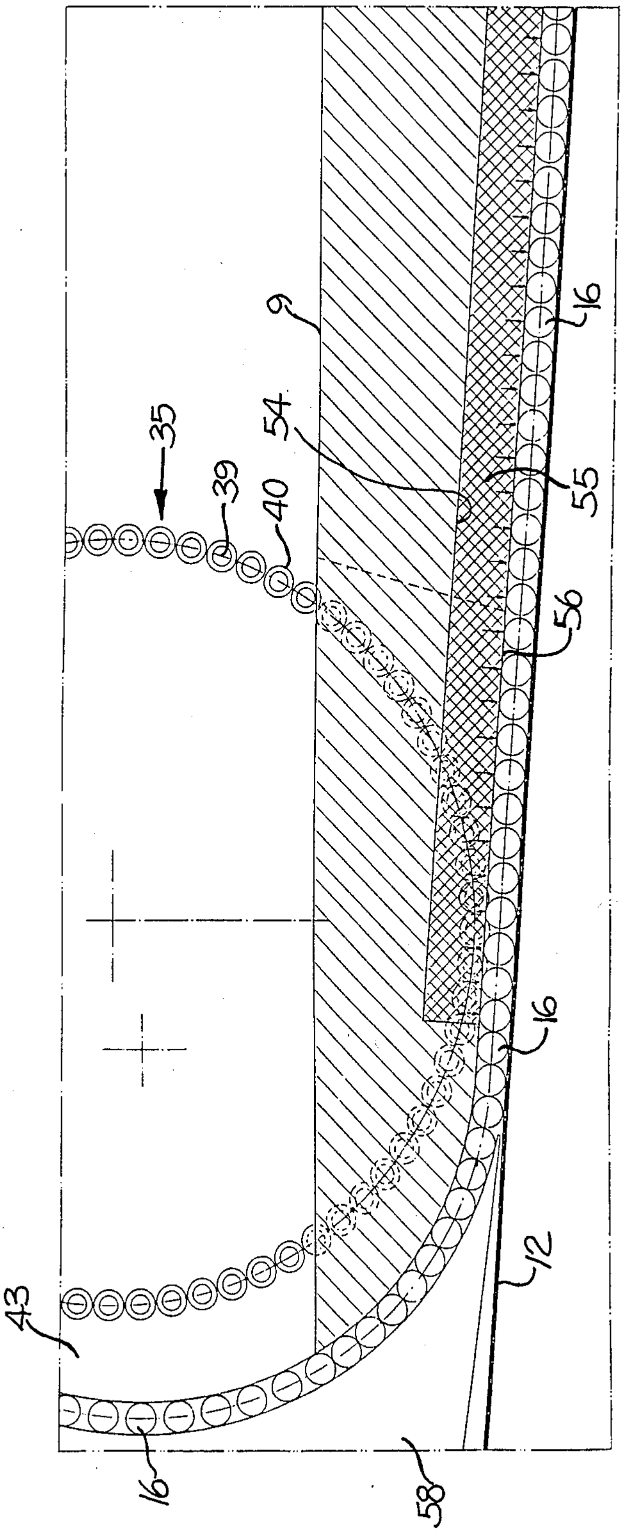

In the embodiment shown each press plate 9, 10 within the entry section 23 is provided with a plurality of grooves 54 (FIG. 6) extending in the longitudinal direction of the press plate and each arranged to receive a resilient element 55. The surface 56 thereof facing the press belt 12, 13 lies slightly outside the press plate 9, 10 (although this is not immediately evident from FIG. 6). The shown resilient element 55 consists of a solid body of rubber. However, the resilient element may be designed in many different ways to achieve the desired pre-stressing force onto the rods. It might, for instance, have a hollow profile for compressed air to be blown in, whereby an adjustable force is obtained. Thus, during operation the slimmest rods, within a predetermined tolerance range, will roll in contact with the press belt 12, 13 and the resilient elements 55, while other rods will roll in contact with the press belt 12, 13 and the pressure plate. The use of the resilient elements thus prevent slimmer rods from sliding and rushing ahead in an uncontrolled manner and thereby altering the pitch obtained by means of the rollers 40.

The press belts 12, 13 between which the web 1 is compressed, must be sufficiently flexible to permit the guiding around the guide rolls 17–20. However, these guide rolls must not have too large dimensions for reasons of cost and space. At the same time the press belts must be able to transmit the compression pressure from the rods to the web without becoming fatigued by bending stresses. Furthermore, the press belts must withstand an operating temperature of 200°-250° C. and be produced with uniform thickness, in widths up to at least 2700 mm. At the surface pressure normally required, i.e. 2.5–5 MPa, cold-rolled, high-strength steel strip offers the most suitable material so far, the steel strips being welded together to full width and endless. Such steel strips can only be obtained having a thickness of 1–2 mm and the pitch between the rods must be limited to 12–25 mm for the reasons mentioned above. Since the pitch may be changed somewhat when the rods pass through the pressing zone, as explained earlier, a suitable initial pitch is 11–23 mm with a corresponding rod diameter of 10–21 mm.

The described hot press according to the invention functions in the following manner. As a practical embodiment it is assumed that the rods 16 have a diameter of 16 mm and that they are joined to play forming links 30, 31 in such a way that the relative distance between them may vary between 0 and 4 mm. This distance is adapted to a desired rod pitch of about 18 mm at the start of the pressing zone, i.e. a distance of about 2 mm between the rods 16.

Outside the press platens 3, 4, the rods 16 are conveyed by means of stretched chains, i.e. with a rod pitch of 20 mm, whereby the rods are passing over toothed wheels 53 which are adapted for such a pitch. At each rotated revolution the wheels 39 provided with rollers 40 admit as many rods 16 to enter the pressing zone 22 as there are rollers 40 around the periphery of each wheel 39. By maintaining a constant gear ratio between the driving of the toothed wheel 53 and that of the wheel unit 37, a constant number of rods 16 will be present between these wheels. If the number of rods between the wheels is chosen so that the average rod pitch is suitably less than 20 mm, it will be possible to pack together some of the rods 16 nearest the wheels 39 so that the rods 16 will be in contact with each other, i.e. the rod pitch is 16 mm, along the entire length of the rod, with the rods parallel to each other. This packing together occurs continuously since the wheels 39 with their rollers 40 retards the linear speed of the rods at the same time as the supplementary device with belts 44 or 48 feeds the rods forward and aligns them in a storage position. A stock of rods 16 packed closely together is thus formed due to the retarding effect of the roller wheels 39 and the feeding produced by the belts 44 or 48 so that an initial straightening or alignment of the rods is achieved. Since the rollers 40 on the wheels 39 for each shaft 38 are aligned to each other with coinciding central axes 41, as described above, each rod 16 will be in contact with all rollers 40 of a transverse row of rollers so that the rod will be accurately aligned parallel to the wheel shaft 38. Moreover, this also ensures that the rods achieve an optimum desired straightness.

Kinematically the process at the roller wheels 39 is such that the rods 16 come into contact one after another with a series of rollers 40 with the side thereof facing the pressing zone, whereupon the rod in question and those following behind it which are in contact with each other are momentarily retarded to a somewhat lower linear speed and then continuously accelerated to a linear speed corresponding to half the speed of the press belts. At this moment the rollers 40, which up to now have had a retarding effect, will leave the rod 16, and the linear movement of this rod will continue as it rolls between the movable belt and the stationary press plate with unchanged speed. At the same moment, the rollers 40 next behind the rod 16 in question will come into contact with the rod for the first and only time. The result of this process is that the rods will be dispensed into the pressing zone 22 with a constant relative pitch which is slightly greater than the linear distance between the rollers 40 and parallel to the respective shafts, i.e. completely straight and aligned perpendicularly to the direction of movement of the belt. This ensures that the rods roll forward through the pressing zone with a desired small pitch distance without catching up each other and without losing the play to the chains.

Instead of delivering the rods to the pressing zone for free rolling with predetermined constant pitch, the delivery can be controlled so that the rod pitch is varied in accordance with a predetermined pattern deviating from uniform pitch, e.g. 16 mm-18 mm-16 mm-18 mm, and so on.

We claim:

1. A hot press for continuous treating a continuous web of material which is rolled into rolls or cut into boards, said hot press comprising an upper and a lower press platen, both of which are horizontal, an upper press belt running between the press platens in an upper loop over guide rolls and a corresponding lower press belt running between the press platens in a lower loop over guide rolls, and an upper movable bed of rolling bodies arranged between the upper press platen and the upper press belt, and a lower movable bed of rolling bodies arranged between the lower press platen and the lower press belt, said rolling bodies consisting of solid, elongate, cylindrical rods arranged to be conveyed in a course of circuit through the hot press, said press belts defining between them within the region of the press platens a pressing zone having an entry section converging in the direction of movement of the web, for introducing said web, wherein an aligning and feeding means is arranged for each bed of rods in connection to said entry section of the pressing zone, and comprises a rotatable wheel unit arranged within the entry section of the pressing zone and having a horizontal, rotatable shaft journalled perpendicularly to the direction of movement of the press belt, and a plurality of wheels secured to said shaft, each of said wheels peripherally supporting a plurality of relatively short cylindrical rollers which are rotatably journalled with their central axes parallel to the shaft of the wheel unit, said rollers of one wheel being coaxially aligned with the rollers of the other wheels to form rows of rollers located transverse to the direction of movement of the press belt, and that the rows of rollers in the rotatable wheel unit are arranged to be brought into contact with the rods recirculated to the entry section in such a manner that, upon contact with one rod, one row of rollers retards the movement of said one rod in relation to the press platen, thus packing the other rods located next upstream closely together, and then delivers said one rod to the pressing zone for free rolling with a predetermined pitch between the rods.

2. A hot press according to claim 1, wherein said predetermined pitch between the rods in the pressing zone is constant.

3. A hot press according to claim 1, wherein the rods are free from retaining members at least during their transport through the pressing zone.

4. A hot press according to claim 1, wherein the ends of the rods are connected by means of chain links for their movement in said course of circuit outside the pressing zone, the links thereof being provided in longitudinal direction with oblong or extended apertures to receive the ends of the rods with a play therebetween, and that said link apertures having sufficient horizontal extension to permit said free rolling of the rods through the pressing zone without being brought into engagement with the links influencing their movement.

5. A hot press according to claim 1, wherein the press plates of the press platens have inner, curved surface portions to form said converging entry section of the pressing zone, each curved surface portion also giving corresponding bending of the press belt so that a stretch force required for operation of the press belts presses the rods against the curved surface portions.

6. A hot press according to claim 1, wherein each press plate is provided with vertical recesses through which the wheels rotating as a unit are arranged to pass in order to bring their rollers into contact with the rods.

7. A hot press according to claim 4, wherein curved guide plates are arranged immediately before the entry section to guide the rods before they reach the press belts.

8. A hot press according to claim 4, wherein the aligning and feeding means includes a supplementary device mounted immediately before the entry section of the pressing zone, to feed the rods forward to a storage position where they are packed together and aligned.

9. A hot press according to claim 8, wherein the supplementary device comprises belts rotating over pulleys and running in contact with the rods to feed them forward and align them closely together with the desired straightness and perpendicular to the direction of movement of the press belt.

10. A hot press according to claim 1, wherein a plurality of resilient elements are mounted within the entry section of each press plate to exert a prestressing force onto at least rods of slimmer dimensions than other rods within a given tolerance range of rods.

11. A hot press according to claim 10, wherein the resilient elements consist of solid or hollow bodies of elastic material mounted in longitudinal grooves in the press plate.

* * * * *